United States Patent [19]

Nagamoto et al.

[11] Patent Number: 4,509,790
[45] Date of Patent: Apr. 9, 1985

[54] LOWER BODY STRUCTURE OF CAB-OVER - TYPE AUTOMOBILES

[75] Inventors: Yoshihito Nagamoto; Sadao Ozeki, both of Hiroshima, Japan

[73] Assignee: Mazda Motor Corporation, Hiroshima, Japan

[21] Appl. No.: 458,710

[22] Filed: Jan. 17, 1983

[30] Foreign Application Priority Data

Jan. 18, 1982 [JP] Japan .................................. 57-5834

[51] Int. Cl.³ ............................................. B62D 27/00
[52] U.S. Cl. ..................................................... 296/204
[58] Field of Search ............... 296/204, 205, 194, 195, 296/197, 198; 180/292, 294, 88

[56] References Cited

U.S. PATENT DOCUMENTS

| | | | |
|---|---|---|---|
| 2,794,650 | 6/1957 | Schilberg | 296/204 |
| 3,285,653 | 11/1966 | Komenda | 296/204 |
| 3,907,356 | 9/1975 | Sien | 296/204 |
| 4,068,884 | 1/1978 | Watanabe et al. | 296/204 |
| 4,263,980 | 4/1981 | Harlow, Jr. et al. | 180/292 |

FOREIGN PATENT DOCUMENTS 46-22551 3/1972 Japan .

Primary Examiner—Robert R. Song
Attorney, Agent, or Firm—Fleit, Jacobson, Cohn & Price

[57] ABSTRACT

A lower body structure for a cab-over type automobile including a pair of longitudinally extending side frame assemblies and a floor panel. Each side frame comprises a front side frame and a rear side frame. The floor panel comprises a front floor panel connected to the front side frame of each side frame assembly, a rear floor panel connected to the rear side frame of each side frame assembly. Each front side frame has a rearward extension extending rearwardly beyond the confine of the front floor panel, and each rear side frame has a forward extension extending forwardly beyond the confine of the rear floor panel and connected with the rearward extension of the front side frame. A central floor panel is connected to the rearward extensions of the front side frames and the forward extensions of the rear side frames.

16 Claims, 10 Drawing Figures

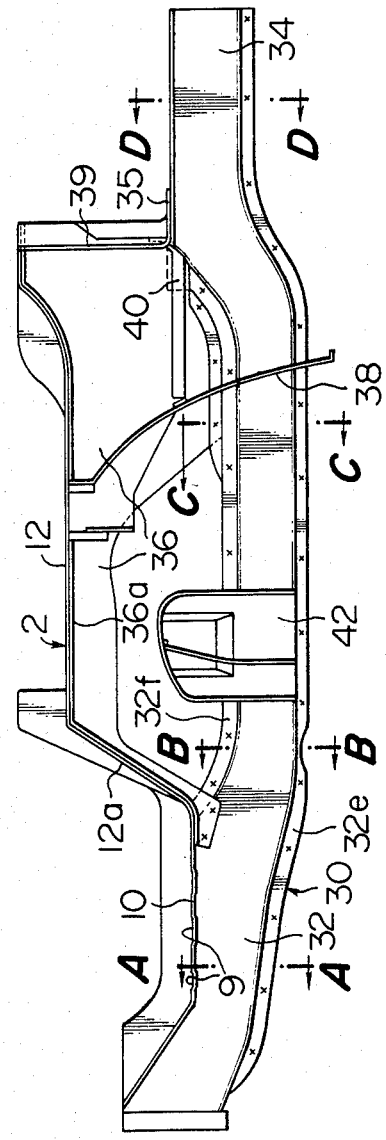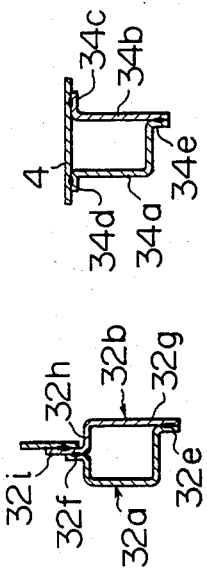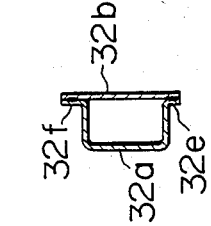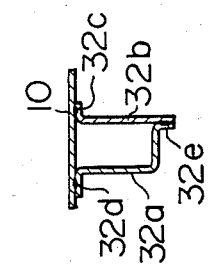

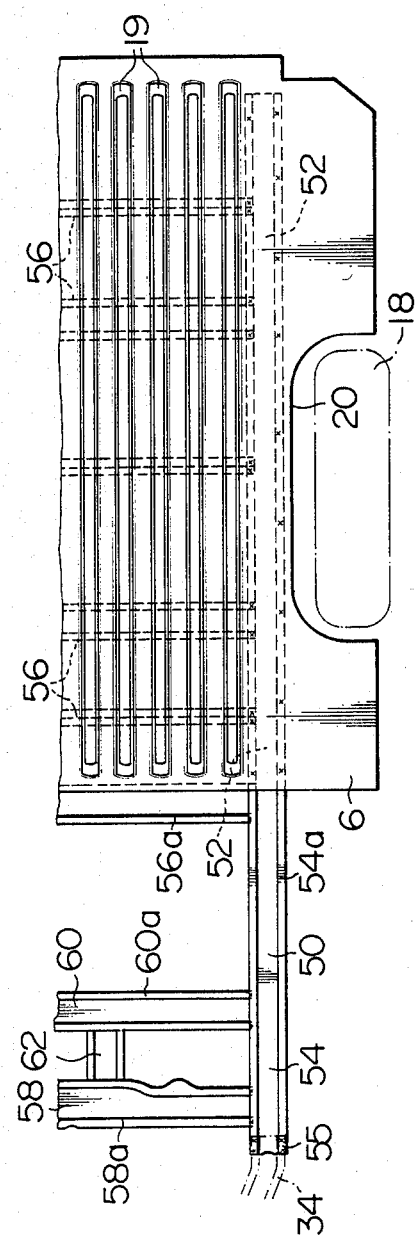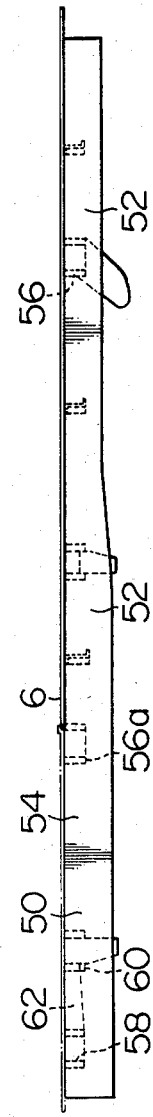
FIG. 4
FIG. 5

LOWER BODY STRUCTURE OF CAB-OVER TYPE AUTOMOBILES

The present invention relates to automobile body structures and more particularly to lower body structures of cab-over type automobiles.

Conventionally, in a cab-over type automobile wherein the drivers cabin is overhung forwardly beyond the front axle, the lower structure is composed of a pair of longitudinally extending side members connected together by a plurality of transversely extending cross-members which are located on the side members with a suitable longitudinal spacing from each other. On the cross-members, there is located a floor panel which is formed with a plurality of longitudinally extending beads. An example of such body structure is disclosed by Japanese utility model application No. 46-22551 filed on Mar. 31, 1971 and disclosed for public inspection on Oct. 31, 1972 under the disclosure No. 47-18225.

It should however be noted that in this type of conventional body structures the floor panel has no contribution to the strength of the body for bearing external loads transmitted through the wheels. It has long been recognized that a semi-monocock type body structure is advantageous in respect of weight and rigidity and that if such structure is adopted to a truck body the height of the floor can advantageously be decreased. When the semi-monocock structure truck body is to be built, the floor panel has to be welded to side frames by for example spot welding. For carrying out such welding, the welding operation may be started from one longitudinal end of the floor panel to the other end, however, as the welding operation proceeds, welding distortions are accumulated at the other end of the floor panel so that the floor panel may be displaced with respect to the side frames. In order to eliminate the accumulation of welding distortions, the welding operation may be performed simultaneously throughout the length of the floor panel, however, a large scale welding machine is required for the purpose.

It is therefore an object of the present invention to provide a lower body structure for a cab-over type automobile in which spot welding operations can be performed easily with a small welding machine.

Another object of the present invention is to provide a lower body structure of semi-monocock type which can be assembled substantially by spot weldings without having problems of accumulation of welding distortions.

According to the present invention, the above and other objects can be accomplished by a lower body structure for a cab-over type automobile including a pair of longitudinally extending side frame assemblies, each comprising a front side frame and a rear side frame, a front floor panel connected to said front side frame of each side frame assembly, a rear floor panel connected to said rear side frame of each side frame assembly, each said front side frame having a rearward extension extending rearwardly beyond confine of said front floor panel, each said rear side frame having a forward extension extending forwardly beyond confine of said rear floor panel and connected with said rearward extension of said front side frame, a central floor panel connected to the rearward extensions of the front side frames and the forward extensions of the rear side frames. The central and rear floor panels may together constitute a cargo-compartment floor and the central floor panel may be provided at the opposite sides with step panels which are located transversely outwards of the side frame assemblies.

In a preferable aspect of the present invention, the front floor panel includes a lower floor portion providing a floor of a cabine, a raised portion contiguous with a rear end portion of the lower floor portion and located at a higher position to provide a support for seat means, and a substantially vertical rear wall portion extending downwardly from a rear end portion of the raised portion, said front frames of the side frame assemblies being connected to the lower floor portion and the rear wall portion of the front floor panel. The front and rear side frames may preferably be of hat-shaped cross-sectional configurations and connected with the floor panels to form frame structures of closed cross-sections. According to the features of the present invention, the floor panel is thus divided into three sections so that it is possible to prevent accumulation of welding distortions during welding operations.

The above and other objects and features of the present invention will become apparent from the following descriptions of a preferred embodiment taking reference to the accompanying drawings, in which:

FIG. 3(a) is a side view of the front section shown in FIG. 2;

FIG. 3(b) is a sectional view taken substantially along the line A—A in FIG. 3(a);

FIG. 3(c) is a sectional view taken substantially along the line B—B in FIG. 3(a);

FIG. 3(d) is a sectional view taken substantially along the line C—C in FIG. 3(a);

FIG. 3(e) is a sectional view taken substantially along the line D—D in FIG. 3(a);

FIG. 4 is a fragmentary plan view showing the central and rear sections with the central floor panel removed;

FIG. 5 is a side view of the sections shown in FIG. 4 with the central floor panel installed; and, FIG. 6 is an exploded perspective view of the structure shown in FIG. 1.

Figure 1:
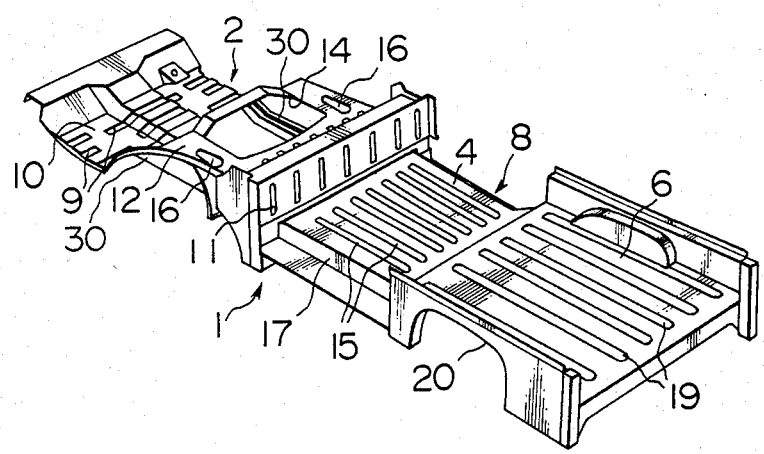
FIG. 1 is a perspective view of a lower body structure for a cab-over type automobile in accordance with the present invention.
Figure 2:
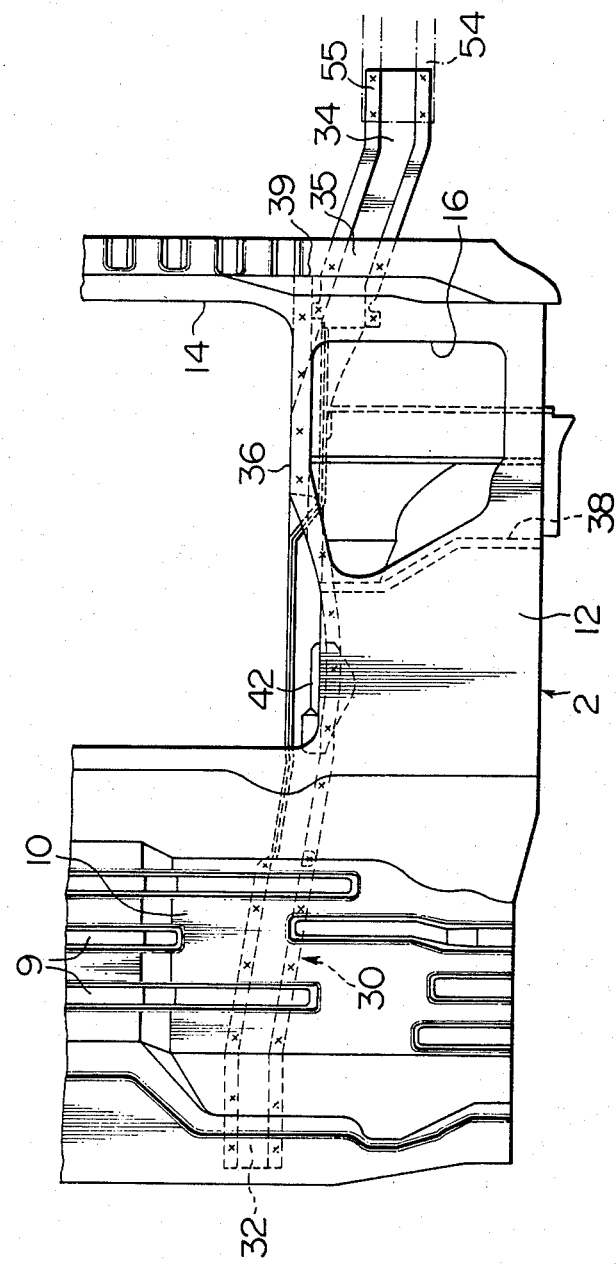
FIG. 2 is a fragmentary plan view of the front section of the structure shown in FIG. 1.

Referring now to the drawings, particularly to FIG. 1, there is shown a lower body structure of a cab-over type automobile. The structure includes a floor panel assembly 8 comprised of a front floor panel 2, a central floor panel 4 and a rear floor panel 6. Referring also to FIGS. 2 and 3(a), it will be noted that the front floor panel 2 includes a lower floor portion 10 formed with a plurality of transversely extending beads 9 and a raised portion 12 which is continuous with the rear edge portion of the lower floor portion 10 through a steeply slanted wall 12a. The raised portion 12 provides a support for passenger's seats as conventional in the art and, beneath the raised portion 12 there is formed an engine and transmission compartment. The raised portion 12 is therefore formed at the central portion thereof with an engine access hole 14 and at the opposite sides of the access hole 14 with further access holes 16 for providing access to the battery and the air cleaner. These access holes 14 and 16 are adapted to be covered by the passenger's seats. The rear end of the raised portion 12 is continuous with a substantially vertical rear wall 39 formed with a plurality of vertical beads 11.

A pair of front side frames 30 are provided beneath the front floor panel 2, one along each side of the panel 2, although only one is shown in FIG. 2. The front side frame 30 includes a base section 32 comprised of an outer panel 32a and an inner panel 32b. As shown in FIG. 3(b), in the forward portion of the base section 32, the inner panel 32b is of a substantially planar cross-section which a transversely inwardly extending upper connecting flange 32c formed along the upper edge. The outer panel 32a is of a substantially L-shaped cross-section with a transversely outwardly extending upper connecting flange 32d formed along the upper edge of the vertical leg of the L-shape and a vertically downwardly extending lower connecting flange 32e formed along the edge of the horizontal leg of the L-shape. The outer and inner panels 32a and 32b are welded together at the flange 32e of the outer panel 32a and the lower edge portion of the inner panel 32b to form a beam structure of a substantially hat-shaped configuration. The outer and inner panels 32a and 32b are welded along their flanges 32d and 32c with the lower floor portion 10 of the front floor panel 2 to form a structure of closed cross-section.

Beneath the raised portion 12, the inner panel 32b is of a complete planar cross-section having no connecting flange, whereas the outer panel 32a of a substantially hat-shaped cross-section with lower and upper connecting flanges 32e and 32f as shown in FIG. 3(c). The outer and inner panels 32a and 32b are welded together at the flanges 32e and 32f of the outer panel 32a and the upper and lower edge portions of the inner panel 32b to form a structure of closed cross-section. As shown in FIG. 3(a), the front side frame 30 is vertically spaced apart from the raised portion 12 of the front floor panel 2.

In the rear part of the base section 32, the outer panel 32a is of a substantially hat-shaped cross-section but the lower and upper connecting flanges 32e and 32f are sidewardly staggered with the upper flange 32f located transversely outwardly of the lower flange 32e as shown in FIG. 3(d). The inner panel 32b has a vertical wall 32g with an upper edge portion contiguous to a transversely outwardly extending horizontal wall 32h which is formed along the outer edge with an upwardly extending flange 32i of a width larger than the width of the flange 32f.

The lower surfaces of the slanted portion 12a and the raised portion 12 are attached with a wheel apron side panel 36 which has an upper connecting flange 36a welded to the portions 12 and 12a. Further, a wheel apron 38 is connected at the upper edge with the raised portion 12 of the front floor panel 12 and at the transversely inner edge portion with the wheel apron side panel 36 and the base section 32 of the front side frame 30.

The base section 32 of the front side frame 30 is contiguous with a rearward extension 34 comprised of an outer panel 34a and an inner panel 34b which are respectively contiguous with the panels 32a and 32b. The inner panel 34b is of a substantially planar cross-section having a connecting flange 34c along the upper edge thereof. The outer panel 34a is of a substantially L-shaped cross-section with an upper horizontal connecting flange 34d and a downwardly extending connecting flange 34e. The panels 34a and 34b are connected together by welding the flange 34e on the outer panel 34a to the lower edge portion of the inner panel 34b to form a substantially hat-shaped cross-sectional configuration. The rear wall 39 of the front floor panel 2 is formed with a lower flange 35 which is welded to the connecting flanges 34d and 34c of the outer and inner panels 34a and 34b. Between the wheel apron 38 and the rear wall 39, there extends a battery tray 40 which is connected thereto at the front and rear ends. Further, the front side frame 30 carries a suspension bracket 42.

Referring now to FIGS. 4 and 5, there is shown a longitudinally extending rear side frame 50. Although only one rear side frame 50 is shown in FIG. 4, it will be understood that the same rear side frame is located at the other side of the body. The rear side frame 50 have base portions 52 which extend substantially in parallel with each other. The base portions 52 are of cross-sections similar to those of the rear extensions 34 of the front side frames 30 and the rear floor panel 6 is welded to the base portions 52 to form structures of closed cross-section. A plurality of longitudinally spaced apart transverse members 56 are provided to extend between the base portions 52 of the rear side frame 50 and welded to the base portions 52 and the rear floor panel 6. The rear floor panel 6 is formed with a plurality of longitudinally extending beads 19 which are transversely spaced apart from each other. Further, the rear floor panel 6 is formed at each side with a cutout 20 for a rear wheel 18.

Each rear side beam 50 has a forward extension 54 contiguous with and forwardly extending from the base portion 52. The extension 54 extends beyond the forward edge of the rear floor panel 6 and connected by welding at the front end with the rear end of the extension 34 as shown by the reference 55 in FIG. 4. Between the extensions 54 of the rear side frame 50, there extends a pair of cross-members 58 and 60 which are of substantially hat-shaped cross-section having connecting flanges 58a and 60a along the upper edges thereof. The cross-members 58 and 60 are welded at the opposite ends with the extensions 54 of the rear side frames 50. The extensions 54 are of cross-section similar to that of the extensions 34 and have upper connecting flanges 54a. The central floor panel 4 having longitudinally extending beads 15 is welded to the flanges 34c and 34d of the extension 34, the flanges 54a of the extension 54 and the flanges 58a and 60a of the cross-members 58 and 60. The central floor panel 4 is further welded at the front edge to the flange 35 on the rear wall 39 and at the rear edge to the front edge of the rear floor panel 6. A further transverse member 56a may be provided and connected to the extensions 54 and the central floor panel 4. Of course, more transverse members 56a may be provided. The central floor panel 4 is connected at the opposite sides with step panels 17 as shown in FIG. 1. The panels 17 may be spot welded to the panel 4. Between the cross-members 58 and 60, there are provided transmission mounting brackets 62.

Figure 6:
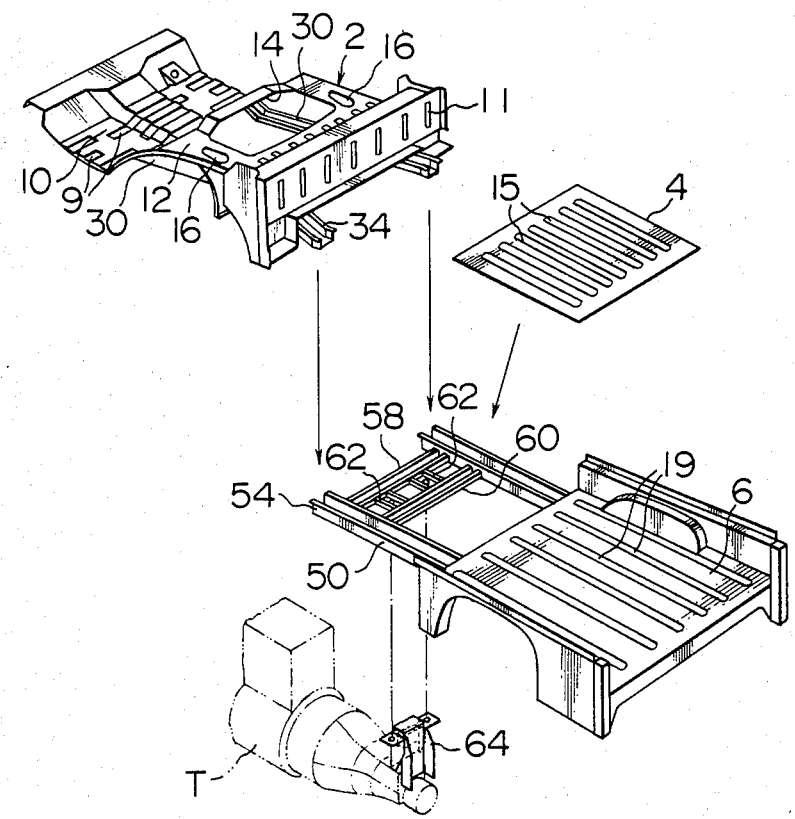

In assembling the body structure described above, the front structure is at first assembled by spot welding the front floor panel 2 and the other panel members to the front side frames 30 as shown in FIG. 6. The rear side frames 50 are also assembled with the members 56, 56a, 58 and 60 and the rear floor panel 6 is connected to these members by spot welding. Then, the rearward extensions 34 of the front side frames 30 are welded to the forward extensions 54 of the rear side frames 50. The central floor panel 4 is then spot welded as described. In the illustrated body structure, the central and rear floor panels 4 and 6 are substantially flat and constitute a floor of cargo-compartment. It will be understood that in the structure described above, the welding operations can be performed substantially with spot welding techniques without using a large scale machine. A transmission T having a mounting bracket assembly 64 is attached to the bracket 62 as shown in FIG. 6.

The invention has thus been shown and described with reference to a specific embodiment, however, it should be noted that the invention is in no way limited to the details of the illustrated structures but changes and modifications may be made without departing from the scope of the appended claims.

We claim:

1. A lower body structure for a cab-over type automobile including a pair of longitudinally extending side frame assemblies, each comprising a front side frame and a rear side frame, a cabin floor panel including a front floor panel connected at least at front and rear portions to said front side frame of each side frame assembly, a rear floor panel connected to said rear side frame of each side frame assembly, each said front side frame having a rearward extension extending rearwardly beyond said front floor panel, each said rear side frame having a forward extension extending forwardly beyond said rear floor panel and connected with said rearward extension of said front side frame, and a central floor panel connected to the rearward extension of the front side frames and the forward extensions of the rear side frames, said front floor panel having a raised portion and front and rear portions, said raised portion being located at a higher position than the front and rear portions of the front floor panel and seat means supported by said raised portion of said front floor panel.

2. A lower body structure in accordance with claim 1 wherein said central and rear floor panels are of substantially flat configurations and connected with said side frame assemblies.

3. A lower body structure in accordance with claim 2 wherein a plurality of transverse members are provided to extend between the rear side frames, said transverse members being connected at the opposite ends with said rear side frames and at upper edge portions with said rear floor panel.

4. A lower body structure in accordance with claim 1 wherein a wheel apron side panel is provided at each side of the body structure beneath the raised portion of the front floor panel, said wheel apron side panel being welded to the front floor panel and the side frame assembly.

5. A lower body structure in accordance with claim 1 wherein said front and rear side frames are substantially of hat-shaped configurations and connected with the floor panels to form frame structures of closed cross-sections.

6. A lower body structure in accordance with claim 1 wherein a pair of parallel cross-members are provided beneath the central floor panel to extend between the side frame assemblies, said cross-members being connected at the opposite ends with the side frame assemblies and at upper portions with said central floor panel, transmission mounting bracket means being provided on said cross-members.

7. A lower body structure in accordance with claim 1 wherein said central and rear floor panels together constitute a cargo-compartment floor and the central floor panel is provided at the opposite sides with step panels located transversely outwards of the side frame assemblies.

8. A lower body structure for a cab-over type automobile including a pair of longitudinally extending side frame assemblies, each comprising a front side frame and a rear side frame, a front floor panel connected to said front side frame of each side frame assembly, a rear floor panel connected to said rear side frame of each side frame assembly, each said front side frame having a rearward extension extending rearwardly beyond said front floor panel, each said rear side frame having a forward extension extending forwardly beyond said rear floor panel and connected with said rearward extension of said front side frame, a central floor panel connected to the rearward extensions of the front side frames and the forward extensions of the rear side frames, wherein said front floor panel includes a lower floor portion, a raised portion contiguous with a rear end portion of the lower floor portion and located at a higher position than said lower floor portion to provide support for seat means, and a substantially vertical rear wall portion extending downwardly from a rear end portion of the raised portion, said front frames of the side frame assemblies being connected to the lower floor portion and the rear wall portion of the front floor panel.

9. A lower body structure in accordance with claim 8, wherein said central and rear floor panels are of substantially flat configurations and connected with said side frame assemblies.

10. A lower body structure in accordance with claim 9, wherein a plurality of transverse members extend between the rear side frames, and transverse members being connected at the opposite ends with said rear side frames and at upper edge portions with said rear floor panel.

11. A lower body structure in accordance with claim 8, wherein a wheel apron side panel is positioned at each side of the body structure beneath the raised portion of the front floor panel, said wheel apron side panel being welded to the front floor panel and the side frame assembly.

12. A lower body structure in accordance with claim 8, wherein said front and said rear side frames are substantially of hat-shaped configurations and are connected with the floor panels to form frame structures of closed cross-section.

13. A lower body structure in accordance with claim 8, wherein a pair of parallel cross-members are positioned beneath the central floor panel to extend between the side frame assemblies, said cross-members being connected at opposite ends with the side frame assemblies and at upper portions with said central floor panel and transmission mounting bracket means being provided on said cross-members.

14. A lower body structure in accordance with claim 8, wherein said central and rear floor panels constitute a cargo-compartment floor and the central floor panel is provided at opposite sides with step panels located transversely outwards of the side frame assemblies.

15. A lower body structure in accordance with claim 1, wherein the surface of each rear side frame connected to the central floor panel and the rear floor panel defines an uninterrupted flat plane.

16. A lower body structure in accordance with claim 1, wherein the side frame assemblies are spaced from the edges of the front floor panel, the central floor panel and the rear floor panel.

* * * * *